United States Patent
Zhang et al.

(10) Patent No.: US 8,538,223 B2
(45) Date of Patent: Sep. 17, 2013

(54) METHOD FOR MAKING OPTICAL WAVEGUIDES

(75) Inventors: Jun-Ying Zhang, Woodbury, MN (US); Terry L. Smith, Roseville, MN (US); Barry J. Koch, Woodbury, MN (US); Yasha Yi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 406 days.

(21) Appl. No.: 12/744,589

(22) PCT Filed: Nov. 21, 2008

(86) PCT No.: PCT/US2008/084308
§ 371 (c)(1),
(2), (4) Date: May 25, 2010

(87) PCT Pub. No.: WO2009/073403
PCT Pub. Date: Jun. 11, 2009

(65) Prior Publication Data
US 2010/0260462 A1   Oct. 14, 2010

Related U.S. Application Data

(60) Provisional application No. 60/991,292, filed on Nov. 30, 2007.

(51) Int. Cl.
*G02B 6/10* (2006.01)
*G02B 6/26* (2006.01)

(52) U.S. Cl.
USPC ............................................ 385/131; 385/30

(58) Field of Classification Search
USPC ................................................... 385/131, 30
See application file for complete search history.

(56) References Cited

U.S. PATENT DOCUMENTS

| | | | |
|---|---|---|---|
| 4,781,424 A | 11/1988 | Kawachi et al. | |
| 5,124,543 A * | 6/1992 | Kawashima | 250/208.1 |
| 5,979,188 A | 11/1999 | Ojha | |
| 6,690,871 B2 * | 2/2004 | Lee et al. | 385/129 |
| 6,749,893 B2 | 6/2004 | Ouellet et al. | |
| 7,043,133 B2 * | 5/2006 | Johnson et al. | 385/142 |
| 7,106,448 B1 * | 9/2006 | Vawter et al. | 356/461 |
| 2002/0021879 A1 * | 2/2002 | Lee et al. | 385/129 |
| 2002/0178760 A1 | 12/2002 | Bona et al. | |
| 2002/0182342 A1 | 12/2002 | Ouellet et al. | |

(Continued)

FOREIGN PATENT DOCUMENTS

WO   WO 01/64594 A1   9/2001
WO   WO 2005/047944 A1   5/2005

OTHER PUBLICATIONS

Albers et al., "Reduction of hydrogen induced losses in PECVD-$SiO_xN_y$ optical waveguides in the near infrared," Oct. 30 to Nov. 2, 1995, *Proceedings IEEE/LEOS '95*, San Francisco, USA, 2:88-89.

(Continued)

*Primary Examiner* — Kaveh Kianni
(74) *Attorney, Agent, or Firm* — Gregory D. Allen

(57) ABSTRACT

A method for making a waveguide comprises (a) providing a waveguide structure comprising a substrate (22), a lower cladding (20) layer on the substrate, and a core layer (24) comprising silicon nitride, amorphous silicon, or amorphous silicon-germanium alloy on the lower cladding layer; (b) patterning the core layer; and (c) annealing (28) the waveguide structure.

5 Claims, 5 Drawing Sheets

(56) References Cited

U.S. PATENT DOCUMENTS

| | | | |
|---|---|---|---|
| 2002/0194876 A1 | 12/2002 | Bona et al. | |
| 2004/0037497 A1* | 2/2004 | Lee | 385/28 |
| 2004/0240820 A1* | 12/2004 | Johnson et al. | 385/129 |
| 2005/0169593 A1* | 8/2005 | Hwang et al. | 385/131 |
| 2005/0199013 A1* | 9/2005 | Vandroux et al. | 65/386 |
| 2005/0284181 A1 | 12/2005 | Smith et al. | |
| 2007/0140619 A1* | 6/2007 | Cohen et al. | 385/37 |
| 2008/0253728 A1* | 10/2008 | Sparacin et al. | 385/132 |

OTHER PUBLICATIONS

Bulla et al., "Design and Fabrication of $SiO_2/Si_3N_4$ CVD Optical Waveguides," *Microwave and Optoelectronics Conference*, 1999, SBMO/IEEE MTT-S, IMOC '99 Proceedings, 2:454-457.

Denisse et al., "Annealing of plasma silicon oxynitride films," *J. Appl. Phys.*, 1986, 60(70):2543-2547.

Gonzalvez et al., "Plasma-enhanced chemically vapour deposited $Si_3N_4$ thin films for optical waveguides," 1992, *Thin Solid Films*, 220:311-314.

Henry et al., "Low loss $Si_3N_4$,-$SiO_2$ optical waveguides on Si," 1987, *Applied Optics*, 26(13):2621-2624.

Sinha et al.., "Thermal stresses and cracking resistance of dielectric films (SiN, $Si_3N_4$, and $SiO_2$) on Si substrates," *J. Appl. Phys.*, 1978, 49(4):2423-2426.

Wörhoff et al., "Design, Tolerance Analysis, and Fabrication of Silicon Oxynitride Based Planar Optical Waveguides for Communication Devices," *J. of Lightwave Tech.*, 1999, 17(8):1401-1407.

Wörhoff et al., "Plasma enhanced chemical vapor deposition silicon oxynitride optimized for application in integrated optics," *Sensors and Actuators*, 1999, 74:9-12.

PCT International Search Report for International Application No. PCT/US2008/084308 dated Apr. 27, 2009.

\* cited by examiner

US 8,538,223 B2

METHOD FOR MAKING OPTICAL WAVEGUIDES

CROSS REFERENCE TO RELATED APPLICATIONS

This application is a national stage filing under 35 U.S.C. 371 of PCT/US2008/084308, filed Nov. 21, 2008, which claims priority to U.S. Provisional Application No. 60/991,292, filed Nov. 30, 2007, the disclosure of which is incorporated by reference in its/their entirety herein.

FIELD

This invention relates to a method for making optical waveguides. In another aspect, this invention relates to silicon nitride-based and amorphous silicon-based optical waveguides.

BACKGROUND

Optical waveguides are commonly utilized in optical communication applications. Optical waveguides usually include a core layer sandwiched between a lower cladding layer and an upper cladding layer. Typically, the core layer has a higher refractive index than the lower and upper cladding layers.

Traditionally, silica was used to form the core and the cladding layers, but the core layer was doped (for example, with germanium, phosphorous, or titanium) in order to increase its refractive index relative to the cladding layers. In recent years, there has been increasing focus on fabricating optical waveguides having greater index contrast between the core layer and the cladding layers by using plasma enhanced chemical vapor deposition (PECVD)-grown silicon nitride or silicon oxynitride core layers.

However, high optical losses (for example, 5-10 dB/cm) are often observed in PECVD-grown silicon nitride and silicon oxynitride core layers at infrared (IR) wavelengths used in optical communication applications. It is believed that the losses originate from Si—H, N—H and —OH bonds that are incorporated into the core layer during PECVD from silane, nitrous oxide, and/or ammonia gaseous precursors. It is therefore necessary to anneal the core layer at high temperatures in order to remove the Si—H, N—H and —OH bonds in the core layer.

Silicon nitride-based and silicon oxynitride-based ridge waveguides are thus typically fabricated using the sequence illustrated in FIGS. 1(a)-1(e). First, as shown in FIG. 1(a), a lower cladding layer 10 (for example, a silicon dioxide lower cladding layer) is deposited on a silicon wafer substrate 12. Then, as shown in FIG. 1(b), the silicon nitride or silicon oxynitride core layer 14 is deposited on the lower cladding layer 10 using PECVD. Next, as depicted in FIG. 1(c), the structure is annealed 18 and then, as shown in FIG. 1(d), the core layer 14 is patterned. Finally, as shown in FIG. 1(e), an upper cladding layer 16 (for example, a silicon dioxide upper cladding layer) is deposited on the annealed patterned core layer 14.

Silicon oxynitride core layers having a refractive index above about 1.6, however, can develop cracks as a result of high temperature annealing (for example, annealing at about 1000° C. or above). The cracking is due to the differing thermal expansion coefficients of the silicon oxynitride core layer, the cladding layers, and the silicon wafer. The differing thermal expansion coefficients lead to unacceptably high values of induced tensile stress within the layers. The cracking problem can be even worse with silicon nitride because silicon nitride films have higher tensile stress than silicon oxynitride films.

SUMMARY

In view of the foregoing, we recognize that there is a need for a method for making low optical loss ridge waveguides with core layers having a refractive index above about 1.6.

Briefly, in one aspect, the present invention provides a method for making a waveguide. The method comprises (a) providing a waveguide structure comprising a substrate, a lower cladding layer on the substrate, and a core layer comprising silicon nitride, amorphous silicon, or amorphous silicon-germanium alloy on the lower cladding layer, (b) patterning the core layer, and (c) annealing the waveguide structure. Preferably, the method further comprises depositing an upper cladding layer over the core layer after patterning the core layer, but before annealing the waveguide structure.

Surprisingly, the method of the present inventions allows for effective and crack-free annealing of the silicon nitride, amorphous silicon, or amorphous silicon-germanium alloy core layer at reduced temperatures and in less time relative to conventional ridge waveguide fabrication methods in which annealing is carried out prior to patterning of the core layer. The reduced annealing temperatures of the method of the invention can reduce stress compared to high temperature annealing and thereby improve device quality.

In another aspect, the present invention provides a method for making a ring resonator. The method comprises (a) providing a waveguide structure comprising a substrate, a lower cladding layer on the substrate, and a core layer comprising silicon nitride, amorphous silicon, or amorphous silicon-germanium alloy on the lower cladding layer, (b) patterning the core layer, (c) depositing an upper cladding layer on the core layer to provide a sandwich waveguide structure, (d) annealing the sandwich waveguide structure, (e) depositing a ring resonator layer comprising silicon nitride, amorphous silicon, or amorphous silicon-germanium alloy on the annealed sandwich waveguide structure, and (f) patterning a ring into the ring resonator layer.

In yet another aspect, the present invention provides a ridge or channel waveguide comprising a patterned core layer on a silicon dioxide lower cladding layer; wherein the core layer comprises silicon nitride, amorphous silicon, or amorphous silicon-germanium alloy, has a refractive index between about 1.6 and about 4.6, and is essentially crack-free.

As used herein:

"silicon dioxide" means $SiO_2$, optionally doped with elements such as boron, phosphorous, fluorine, titanium, aluminum, zirconium, and the like, and combinations thereof;

"silicon nitride" includes $Si_3N_4$ and silicon oxynitride compounds represented by the formula $SiO_xN_y$, wherein $0<y<4/3$ and $0<x<2$; and "essentially crack-free" means that the core layer has no cracks within a 4 inch (10 cm) diameter wafer as observed using optical microscopy.

DETAILED DESCRIPTION

Figure 1A:
FIGS. 1 (a), (b), (c), (d), and (e) illustrate a conventional method for making a ridge waveguide using schematic side views.
Figure 1B:
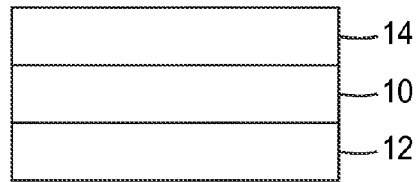
Figure 1C:
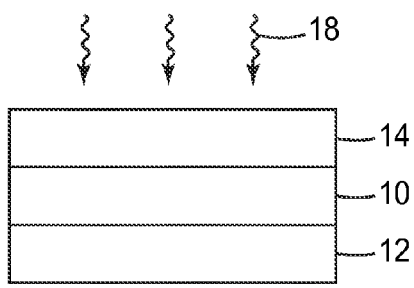
Figure 1D:
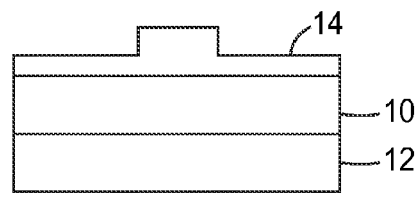
Figure 1E:
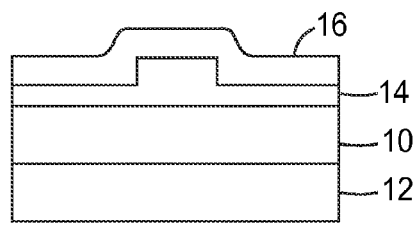
Figure 2A:
FIGS. 2 (a), (b), (c), (d), and (e) illustrate a method for making a ridge waveguide of the invention using schematic side views.
Figure 2B:
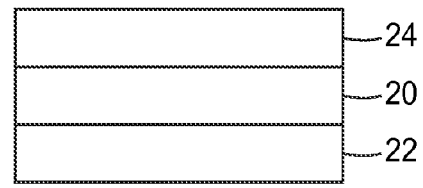
Figure 2C:
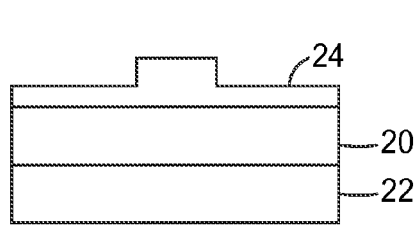
Figure 2D:
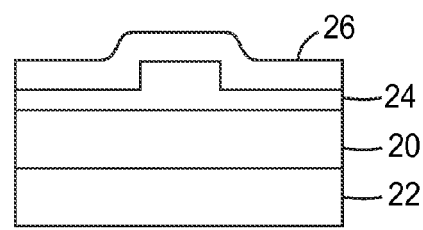
Figure 2E:
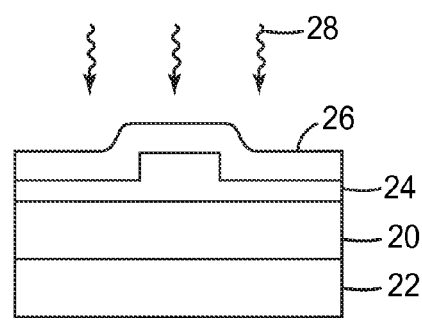
Figure 3A:
FIGS. 3 (a), (b), (c), (d), and (e) illustrate a method for making a channel waveguide of the invention using schematic side views.
Figure 3B:
Figure 3C:
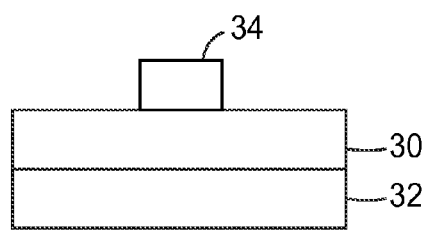
Figure 3D:
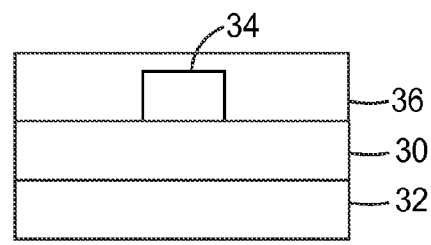
Figure 3E:
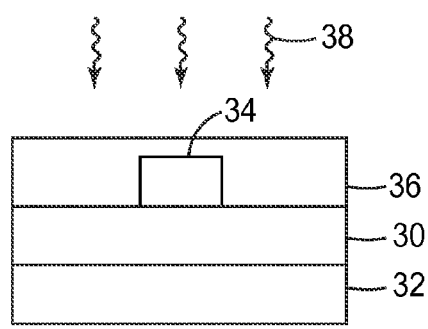

Waveguides of the invention can be fabricated using the methods illustrated in FIGS. 2(a)-2(e) and FIGS. 3(a)-3(e). The method illustrated in FIGS. 2(a)-2(e) illustrates making a ridge waveguide. First, as shown in FIG. 2(a), a lower cladding layer 20 (for example, a silicon dioxide lower cladding layer) is deposited on a substrate 22 (for example, a silicon wafer substrate). Then, as shown in FIG. 2(b), a silicon nitride or amorphous silicon core layer 24 is deposited on the lower cladding layer 20. Next, as shown in FIG. 2(c), the core layer 24 is patterned with a ridge pattern. Then, as shown in FIG. 2(d), an upper cladding layer 26 (for example, a silicon dioxide upper cladding layer) is deposited on the patterned core layer 24. Finally, as depicted in FIG. 2(e), the waveguide is annealed 28. FIGS. 3(a)-3(e) illustrate making a channel waveguide. The method for making a channel waveguide is essentially the same as the method for making a ridge waveguide except the core layer is etched completely through around the channel 34 (as shown in FIG. 3(c)).

Figure 6:
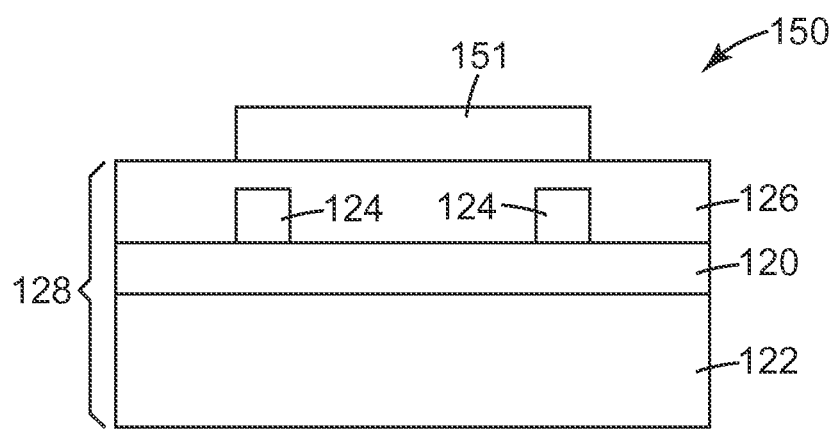
FIG. 6 is a schematic of a ring resonator of the invention.

Referring to FIG. 6, Ring resonator 150 comprises waveguide 128 with ring resonator layer 151. Waveguide 128 comprises lower cladding layer 120 deposited on substrate 122. Patterned core layers 124 are deposited on lower cladding layer 120. Upper cladding layer 126 is deposited over patterned core layer 124.

Waveguides of the invention include a waveguide structure supported on a substrate. The substrate usually consists of a commercially available material such as silicon, sapphire or fused quartz. Preferably, the substrate is a silicon wafer.

The waveguide structure comprises a high index silicon nitride, amorphous silicon, or amorphous silicon-germanium alloy core layer on a low refractive index lower cladding layer (that is, a cladding layer comprising a material having a refractive index lower than the refractive index of the core layer). Preferably, the waveguide structure is a sandwich waveguide structure in which the core layer is sandwiched between a low refractive index lower cladding layer and a low refractive index upper cladding.

The lower cladding layer comprises a relatively low refractive index amorphous material such as, for example, silicon dioxide, zirconium oxide, aluminum oxide, magnesium fluoride, low index doped silica (for example, silica doped with boron, phosphorous, or fluorine), or the like. Preferably, the lower cladding layer comprises silicon dioxide. Preferably, the lower cladding layer has a refractive index between about 1.3 and about 1.5. The lower cladding layer can be deposited on the substrate by methods known in the art. For example, the lower cladding layer can be deposited using a chemical vapor deposition (CVD) process such as PECVD, atmospheric pressure chemical vapor deposition (APCVD), or low pressure chemical vapor deposition (LPCVD); physical vapor deposition (PVD) processes such as sputtering, evaporation, electron beam evaporation, molecular beam epitaxy and pulsed laser deposition; flame hydrolysis deposition (FHD); and sol-gel processes. Preferably, the lower cladding layer is deposited using PECVD.

Typically, the lower cladding layer has a thickness between about 0.5 μm and about 50 μm (preferably, between about 0.5 and about 3 μm).

The core layer comprises silicon nitride, amorphous silicon, or amorphous silicon-germanium alloy (preferably, silicon nitride or amorphous silicon; more preferably, silicon nitride). When the core layer comprises silicon nitride, the nitrogen content of the core layer is typically greater than about 20 mol %. Preferably, the core layer has a refractive index between about 1.6 and 4.6; more preferably, between about 1.6 and about 3.8; most preferably, between about 1.6 and about 2.0. The core layer can be deposited on the lower cladding layer using any of the deposition techniques mentioned above. Preferably, the core layer is deposited using PECVD.

Typically, the core layer has a thickness between about 0.1 μm and about 2 μm (preferably, between about 0.1 μm and about 1 μm).

The core layer can be patterned using patterning techniques known in the art such as, for example by photolithography and reactive ion etching (RIE) or by ion beam etching (preferably, by photolithography and RIE). Typically, a ridge or channel will have a width between about 0.5 μm and about 7 μm.

After the core layer has been patterned, an optional upper cladding layer can be deposited on it. The upper cladding layer comprises a relatively low refractive index amorphous material such as, for example, silicon dioxide, zirconium oxide, aluminum oxide, magnesium fluoride, low index doped silica (for example, silica doped with boron, phosphorous, or fluorine), or the like. Preferably, the upper cladding layer comprises silicon dioxide. Preferably, the lower cladding layer has a refractive index between about 1.3 and about 1.5. The lower cladding layer can be deposited on the substrate by methods known in the art such as those mentioned above. Typically, the upper cladding layer has a thickness between about 0.05 μm and about 50 μm (preferably, between about 0.05 μm and about 3 μm The waveguide structure can be annealed after the core layer has been patterned (or after the upper cladding layer has been deposited if the waveguide structure has a sandwich structure). The method of the invention allows for annealing at lower temperatures than conventional processes and therefore provides waveguides with less stress-induced birefringence. For example, the sandwich waveguide can be effectively annealed at a temperature between about 600° C. and about 1000° C. (preferably, between about 700° C. and about 900° C.). The method of invention also allows for reduced annealing times and thus reduced production cost. Preferably, the waveguide is annealed for at least about 1 hour (preferably, for about 2 hours to about 4 hours). The resulting waveguide is essentially crack-free and exhibits low optical loss at wavelengths used in optical communication applications. Preferably, the waveguides exhibit an optical loss of less than about 0.15 dB/cm at wavelengths between about 1310 nm and about 1565 nm (more preferably, less than about 0.1 dB/cm).

Waveguides of the invention can be used to fabricate a variety of devices for optical communications applications such as, for example, splitters, switches, optical filters, directional couplers, and the like, or for optical biosensors.

EXAMPLES

Objects and advantages of this invention are further illustrated by the following examples, but the particular materials and amounts thereof recited in these examples, as well as other conditions and details, should not be construed to unduly limit this invention.

Example 1

Ring Resonator with SiO$_2$/SiN Ridge/SiO$_2$ Sandwich (with Annealing)

The invention is demonstrated by fabrication of a vertically coupled ring resonator with a 100 μm diameter. The ring resonator was fabricated as follows.

A 3 μm thick borophosphosilicate glass (BPSG) lower cladding layer with a refractive index of 1.46 was deposited on a 0.5 mm Si wafer (100) (Si wafer was obtained from Montco Silicon Technologies, Inc., Spring City, Pa.) by plasma enhanced chemical vapor deposition (PECVD, Model PlasmaLab™ System100 available form Oxford Instruments, Yatton, UK) using the following parameters listed in Table 1.

TABLE 1

Conditions used for depositing BPSG low cladding layer

| Reactant/Condition: | Value: |
|---|---|
| SiH$_4$ | 17 sccm |
| B$_2$H$_6$ | 3.5 sccm |
| PH$_3$ | 1.8 sccm |
| N$_2$O | 1500 sccm |
| N$_2$ | 600 sccm |
| RF power | 130 W |
| Pressure | 2000 mTorr |
| Temperature | 350° C. |

After the BPSG layer was formed on the Si wafer, the sample was heated to 1080° C. in a furnace with a ramp rate of 5° C./min and held at that temperature for approximately 4 hours to allow the BPSG to reflow. After the heat treatment, a 250 nm thick SiN core layer was deposited on the BPSG lower cladding layer by PECVD using the following parameters described in Table 2.

TABLE 2

Conditions used for depositing SiN core layer

| Reactant/Condition: | Value: |
|---|---|
| SiH$_4$ | 400 sccm |
| NH$_3$ | 20 sccm |
| N$_2$ | 600 sccm |
| Pressure | 650 mTorr |
| Temperature | 350° C. |
| High frequency (HF) power | 20 W |
| Low frequency (LF) power | 20 W |

The refractive index of the SiN core layer was measured using a Metricon Model 2010 Prism Coupler (Metricon Corporation, Pennington, N.J.) and was found to be 2.

After deposition of the SiN core layer was completed, a positive photoresist, referred to hereinafter as "PR" (Shipley PR1813 available from Electronic Materials Inc., Spartanburg, S.C.) was coated on the SiN core layer by spin coating. The PR layer was patterned using a waveguide pattern mask and standard photolithography techniques. An etch process was then performed to etch the waveguide core layer and form ridge waveguide cores. A reactive ion etch (RIE, Model PlasmaLab™ System100 available form Oxford Instruments, Yatton, UK) was conducted according to the following conditions described in Table 3. The waveguide was nominally 2.5 μm in width and the etch depth was 50 to 200 nm.

TABLE 3

Materials/Conditions used for Reactive Ion Etching

| Reactant/Condition: | Value: |
|---|---|
| C$_4$F$_8$ | 10-50 sccm |
| O$_2$ | 0.5-5 sccm |
| RF power | 50-100 W |
| Inductive Coupling Plasma (ICP) power | 1000-2000 W |
| Pressure | 3-10 mTorr |

Following the ion etching, a 100 nm thick SiO$_2$ upper cladding layer was deposited on the patterned waveguides, forming the SiO$_2$/SiN ridge/SiO$_2$ sandwich waveguide structure. The SiO$_2$ upper cladding layer using deposited using PECVD according to the following conditions described in Table 4.

TABLE 4

Conditions used for depositing 100 nm SiO$_2$ layer

| Reactant/Condition: | Value: |
|---|---|
| SiH$_4$ | 15 sccm |
| N$_2$O | 1500 sccm |
| N$_2$ | 600 sccm |
| HF power | 104 W |
| LF power | 30 W |
| Pressure | 400 mTorr |
| Temperature | Temperature: 350° C. |

The resulting sample was placed in a furnace and annealed in air at 800° C. for 5 h using a heating and cooling rate of 2° C./min. The wave guide was crack-free as observed by optical microscopy.

Figure 4:
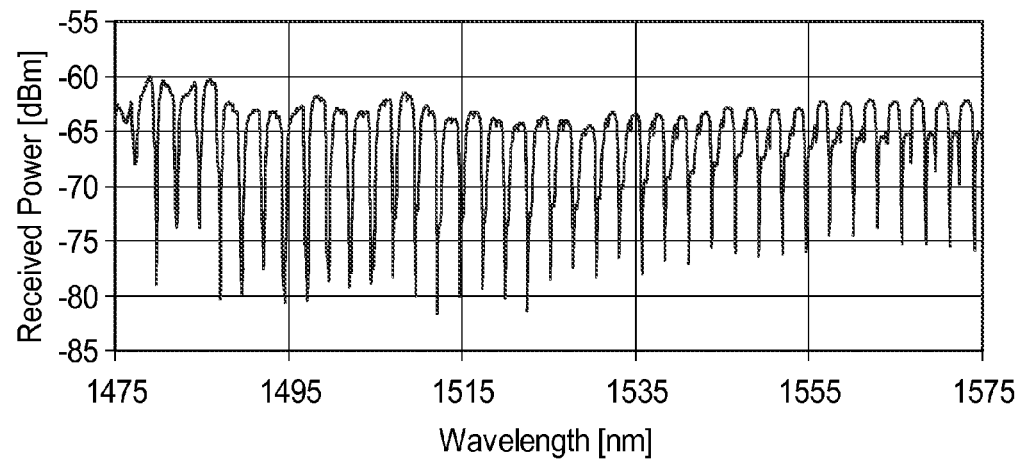
FIG. 4 is a plot of Received Power versus Wavelength for the ring resonator of Example 1.

After annealing the sandwich waveguide, a ring resonator was fabricated on the upper cladding layer. This was done by depositing a 250 nm thick SiN layer on the SiO$_2$/SiN ridge/SiO$_2$ sandwich waveguide, using identical deposition parameters as described in Table 2. A 100 μm diameter ring was defined by standard photolithography process using a ring mask followed by reactive ion etching (RIE), using identical etching parameters as described in Table 3. After etching of the PR, the individual chip was cut and polished for optical measurements. Optical measurements were obtained using a Nuphoton NP2500-ASE (Nuphoton Technologies, Inc., Murrieta, Calif.) as the optical source and a JDS Uniphase PS3 PDL Multimeter (JDS Uniphase Corporation, Milpitas, Calif.) as the detector. A plot of Received Power versus Wavelength for the ring resonator of the 100 μm ring is shown in FIG. 4. A relatively flat curve was observed. There was minimal absorption at wavelengths between 1495 nm and 1555 nm.

Comparative Example 1

Ring Resonator of SiO2/SiN Ridge/SiO2 Sandwich (No Annealing)

Figure 5:
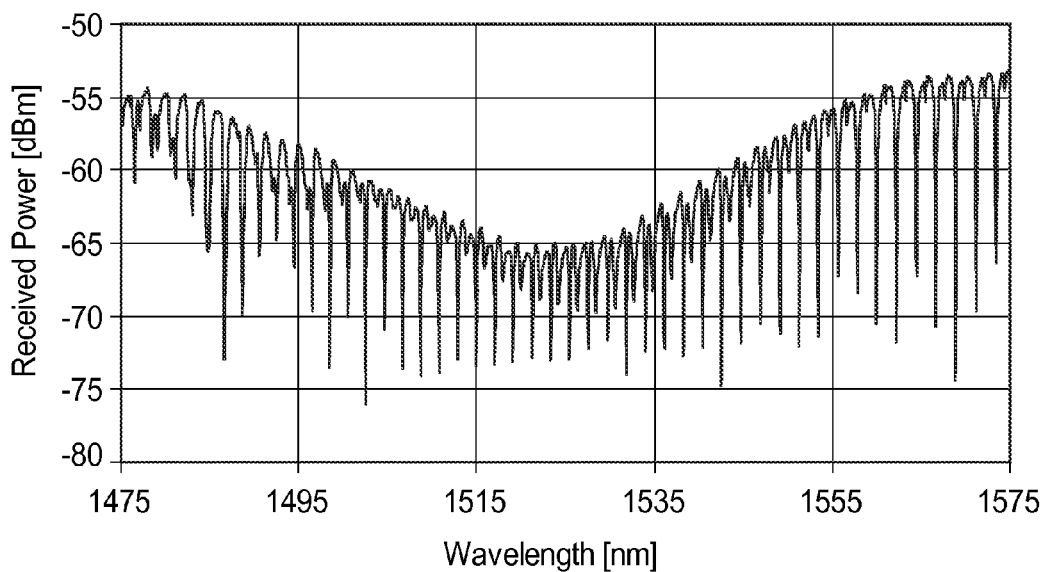
FIG. 5 is a plot of Received Power versus Wavelength for the ring resonator of Comparative Example 1.

Another sample was fabricated using the process described in Example 1 except that the waveguide was not annealed. A plot of Received Power versus Wavelength for the ring resonator of the 100 μm ring is shown in FIG. 5. Strong waveguide absorption at wavelengths between 1495 nm and 1555 nm was observed for this sample due to absorption of N—H and Si—H vibrational overtones.

Comparative Example 2

Fabrication of Planar SiON Core Layer (No Pattern; Annealed)

700 nm thick SiON core layers were deposited on several Si wafers by PECVD using the following parameters described in Table 5.

TABLE 5

| Conditions used for depositing SiON layer | |
|---|---|
| Reactant/Condition: | Value: |
| SiH$_4$ | 400 sccm |
| NH$_3$ | 20 sccm |
| N$_2$O | 80 sccm |
| N$_2$ | 600 sccm |
| Pressure | 1000 mTorr |
| HF power | 60 W |
| Temperature | 350° C. |

The refractive index of the SiN core layer was measured using a Metricon Model 2010 Prism Coupler and was found to be 1.78.

SiON core layers of Comparative Example 2 were annealed in a furnace at a ramp rate of 2° C./min at 600° C., 700° C., 800° C., 900° C. and 1000° C. for 30 minutes.

Examples 2 and 3

Fabrication of Ridge SiON Core Layers (Patterned; Annealed)

Several of the Si wafers coated with 700 nm thick layer of SiON coatings prepared as described in Comparative Example 2 were coated with a PR, and the PR layer was patterned using a waveguide pattern mask and standard photolithography techniques. A reactive ion etch was conducted according to the conditions described in Table 3 to form ridge waveguide cores (100 μm ridge in Example 2; 50 μm ridge in Example 3).

SiON core layers of Examples 2 and 3 were annealed in a furnace at a ramp rate of 2° C./min at 600° C., 700° C., 800° C., 900° C. and 1000° C. for 30 minutes. The SiON core layers were crack-free when observed using optical microscopy.

Comparative Examples 3

Fabrication of Planar SiON Core Layer (No Pattern; No Annealing)

Comparative Example 3 samples were prepared in the same manner as Comparative Example 2, except that they were not annealed.

Comparative Examples 4 and 5

Fabrication of Planar and Ridge SiON Core Layers (Patterned; No Annealing)

Comparative Example 4 and 5 samples were prepared in the same manner as Example 2 materials, except that they were not annealed. A reactive ion etch was conducted according to the conditions described in Table 3 to form ridge waveguide cores (100 μm ridge in Comparative Example 4; 50 μm ridge in Comparative Example 5).

Fourier Transform InfraRed (FTIR) Analysis

Comparative Examples 2, 3, 4, and 5 and Examples 2 and 3 were analyzed using FTIR spectroscopy using a Nicolet Magna-IR 750 Spectrometer Series II (Nicolet Analytical Instruments, Madison, Wis.). A small peak around 3357 cm$^{-1}$ is assigned to N—H vibrational mode. Table 6 shows the area underneath the N—H peak (3357 cm$^{-1}$) of SiON layers for the samples.

TABLE 6

| Area Underneath N—H Peak | | | | | | |
|---|---|---|---|---|---|---|
| | Area under N—H peak: Annealing Temperature (° C.) | | | | | |
| Example No: | No anneal | 600 | 700 | 800 | 900 | 1000 |
| Comp. Ex. 2 | | 815 | 820 | 790 | 737 | 423 |
| Comp. Ex. 3 | 780 | | | | | |
| Comp. Ex. 4 (100 Micron Ridge) | 810 | | | | | |
| Comp. Ex. 5 (50 micron Ridge) | 810 | | | | | |
| Example 2 (100 micron Ridge) | | 647 | 497 | 466 | 420 | 370 |
| Example 3 (50 micron Ridge) | | 371 | 244 | 205 | 158 | 134 |

Example 4

Ring Resonator with SiO$_2$/a-Si Ridge/SiO$_2$ Sandwich (with Annealing)

A 3 μm thick borophosphosilicate glass (BPSG) lower cladding layer with a refractive index of 1.46 was deposited on a 0.5 mm Si wafer (100) (Si wafer was obtained from Montco Silicon Technologies, Inc., Spring City, Pa.) by plasma enhanced chemical vapor deposition (PECVD, Model PlasmaLab™ System100 available form Oxford Instruments, Yatton, UK) using the parameters listed in Table 1.

After the BPSG layer was formed on the Si wafer, the sample was heated to 1080° C. in a furnace with a ramp rate of 5° C./min and held at that temperature for approximately 4 hours to allow the BPSG to reflow. After the heat treatment, a 250 nm thick amorphous silicon (a-Si) core layer was deposited on the BPSG lower cladding layer by PECVD using the following parameters described in Table 7.

TABLE 7

| Conditions used for depositing a-Si layer | |
|---|---|
| Reactant/Condition: | Value: |
| SiH$_4$ | 100-400 sccm |
| Pressure | 1000-2000 mTorr |
| HF power | 30-150 W |
| Temperature | 250-350° C. |

After deposition of the a-Si core layer was completed, a positive photoresist, referred to hereinafter as "PR" (Shipley PR1813 available from Electronic Materials Inc., Spartanburg, S.C.) was coated on the a-Si core layer by spin coating. The PR layer was patterned using a waveguide pattern mask and standard photolithography techniques. An etch process was then performed to etch the waveguide core layer and form ridge waveguide cores. A reactive ion etch (RIE, Model PlasmaLab™ System100 available form Oxford Instruments, Yatton, UK) was conducted according to the conditions described in Table 3. The waveguide was nominally 2.5 μm in width and the etch depth was 50 to 200 nm.

Following the ion etching, a 100 nm thick $SiO_2$ upper cladding layer was deposited on the patterned waveguides, forming the $SiO_2$/a-Si ridge/$SiO_2$ sandwich waveguide structure. The $SiO_2$ upper cladding layer using deposited using PECVD according to the conditions described in Table 4.

The resulting waveguide sample was placed in a furnace and annealed in air at 800° C. for 5 hours using a heating and cooling rate of 2° C./min. After annealing, the waveguide was crack-free when observed with optical microscopy.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A ring resonator comprising a waveguide with a ring resonator layer, the waveguide comprising a lower cladding layer deposited on a substrate, a patterned core layer deposited on the lower cladding layer, and an upper cladding layer deposited over the patterned core layer; wherein the core layer comprises silicon nitride, amorphous silicon, or amorphous silicon-germanium alloy, and is essentially crack-free, wherein the waveguide is a ridge waveguide or a channel waveguide, wherein the ring resonator layer is on the upper cladding layer, and wherein the ring resonator layer has a ring pattern formed therein and comprises silicon nitride, amorphous silicon, or amorphous silicon-germanium alloy.

2. The waveguide of claim 1 wherein the core layer has a refractive index between 1.6 and 4.6 for wavelengths used in optical communication applications.

3. The waveguide of claim 1 further comprising a silicon dioxide upper cladding layer on the patterned core layer.

4. The waveguide according to claim 1 wherein the waveguide exhibits an optical loss of less than 0.15 dB/cm at wavelengths between 1310 nm and 1565 nm.

5. The waveguide according to claim 1 wherein the waveguide is a ridge waveguide.

* * * * *